(12) United States Patent
Xu et al.

(10) Patent No.: US 9,730,233 B2
(45) Date of Patent: Aug. 8, 2017

(54) CHANNEL ALLOCATION METHOD BASED ON SHAPLEY VALUE IN WIRELESS NETWORKS

(71) Applicant: Tsinghua University, Beijing (CN)

(72) Inventors: Ke Xu, Beijing (CN); Yuchao Zhang, Beijing (CN); Yifeng Zhong, Beijing (CN); Youjian Zhao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 78 days.

(21) Appl. No.: 14/427,304

(22) PCT Filed: Jan. 26, 2014

(86) PCT No.: PCT/CN2014/071461
§ 371 (c)(1),
(2) Date: Mar. 10, 2015

(87) PCT Pub. No.: WO2015/007087
PCT Pub. Date: Jan. 22, 2015

(65) Prior Publication Data
US 2015/0223256 A1    Aug. 6, 2015

(30) Foreign Application Priority Data

Jul. 16, 2013 (CN) .......................... 2013 1 0298362

(51) Int. Cl.
*H04W 4/00* (2009.01)
*H04W 72/04* (2009.01)
*H04W 16/14* (2009.01)

(52) U.S. Cl.
CPC ....... *H04W 72/0493* (2013.01); *H04W 16/14* (2013.01)

(58) Field of Classification Search
CPC .......................... H04W 16/14; H04W 72/0493
See application file for complete search history.

(56) References Cited

U.S. PATENT DOCUMENTS

2009/0182599 A1* 7/2009 Kannan ................ G06Q 10/063
705/7.35
2010/0317420 A1* 12/2010 Hoffberg ............ G06Q 30/0207
463/1

OTHER PUBLICATIONS

"Fair Profit Allocation in the Spectrum Auction Using the Shapley Value" by Pan et al., IEEE Globecom 2009 proceedings.*

* cited by examiner

*Primary Examiner* — Ayaz Sheikh
*Assistant Examiner* — Hai-Chang Hsiung
(74) *Attorney, Agent, or Firm* — Kile Park Reed & Houtteman LLC

(57) ABSTRACT

A channel allocation method based on Shapley value in wireless networks is provided. The method comprises: disclosing by a PU (primary user) some idle channels denoted by serial numbers, a utilization rate threshold, a lowest selling price, and an increment between two bidding prices; SUs (secondary users) reporting the corresponding numbers of required channels to the PU; calculating a plurality of legal teams satisfying the utilization rate threshold; classifying the plurality of SUs; calculating the Shapley value of each SU in each legal team; calculating an estimated price of each multi-user in each legal team; determining the retained legal teams; performing an ascending auction process by the retained legal teams; and allocating the channels to the SUs in the winning team.

14 Claims, 3 Drawing Sheets

CHANNEL ALLOCATION METHOD BASED ON SHAPLEY VALUE IN WIRELESS NETWORKS

CROSS-REFERENCE TO RELATED APPLICATION

This application claims priority to and benefits of Chinese Patent Application Serial No. 201310298362.9, filed with the State Intellectual Property Office of P. R. China on Jul. 16, 2013, the entire content of which is incorporated herein by reference.

FIELD

The present invention generally relates to a technical field of allocating channels in wireless networks, and more particularly relates to a channel allocation method based on Shapley value.

BACKGROUND

The spectrum of wireless network is typically divided into channels with fixed size, which are used for special services, such as the channel for receiving television signals. However, such a division is fixed in time and space dimensions, and some channels with very low utilization rates cannot be utilized by those who lacks channels. This restricts the development of wireless networks.

Thus, there is a phenomenon that PUs (primary users) desire to sell idle channels and SUs (secondary users) desire to buy the idle channels. For this, an effective channel allocation method is needed to ensure that SUs can utilize the idle channels sufficiently without influencing the PUs.

SUMMARY

The technical problem to be solved by the present disclosure is to overcome the defects in the prior art.

For this, one objective of the present disclosure is to provide a channel allocation method based on Shapley value in wireless networks. According to embodiments of the present disclosure, the method comprises steps of:

S1: disclosing by a PU some idle channels denoted by serial numbers, a utilization rate threshold P, a lowest selling price K of each idle channel and an increment $\sigma$ between two bidding prices;

S2: reporting the serial numbers of required channels to the PU by a plurality of SUs, and disclosing the serial numbers of required channels by the PU;

S3: calculating a plurality of legal teams formed by SUs according to the utilization rate of a team, wherein a utilization rate of each legal team is larger than or equal to the utilization rate threshold P;

S4: classifying SUs, wherein, if the SU belongs to one legal team, the SU is defined as a single user, and if the SU belongs to two or more legal teams, the SU is defined as a multi-user;

S5: calculating a Shapley value of each SU in each legal team according to the following formula, $$shapley_{SU_i}^{team_j} = \frac{U_{SU_i}}{\sum_{k \in team_j} U_{SU_k}} \times w\{team_j - (SU_i)\},$$

where, $team_j$ denotes the $j^{th}$ legal team, $SU_i$ denotes the $i^{th}$ SU, $U_{SU_i}$ denotes the number of the channels required by $SU_i$, $$\sum_{k \in team_j} U_{SU_k}$$

denotes the total number of the channels required by $team_j$, $shapley_{SU_i}^{team_j}$ denotes the Shapley value of $SU_i$ in $team_j$, and when the total utilization rate of $team_j$ is greater than or equals to the utilization rate threshold P, $w\{team_j-(SU_i)\}$ equals to $w_1$, otherwise, $w\{team_j-(SU_i)\}$ equals to $w_2$;

S6: calculating an estimated price of each multi-user in each legal team according to the following formula, $$price_{SU_{multi}^i}^{team_j} = \frac{1}{shapley_{SU_{multi}^i}^{team_j}} \times U_{SU_{multi}^i} \div P_{team_j},$$

where $$price_{SU_{multi}^i}^{team_j}$$

is an estimated price of the $i^{th}$ multi-user $SU_{multi}$ in $team_j$, $P_{team_j}$ is the utilization rate of $team_j$;

S7: calculating a plurality of retained legal teams according to the estimated price of each multi-user in each legal team; in practice, each $SU_{multi}$ will choose the lowest $$price_{SU_{multi}^i}^{team_j},$$

and stay in the corresponding team;

S8: calculating a sharing price of each SU in each retained legal time after T loops of bidding according to the following formula:

$$PRICE_{SU^n}^{team_j} = \left( \frac{1}{\frac{1}{shapley_{SU_1}^{team_j}} + \frac{1}{shapley_{SU_2}^{team_j}} + \ldots + \frac{1}{shapley_{SU^n}^{team_j}}} \times \frac{1}{shapley_{SU^n}^{team_j}} \times P_{total} \right) \times U_{SU^n}$$

where, $P_{total}=K+T\sigma$;

S9: deleting the retained legal team when a SU in the retained legal time has the sharing price greater than his WTP (willingness to pay); and S10: repeating steps S8 and S9 until one retained legal team is left, and allocating the idle channels to the SUs in this legal team.

In some embodiments of the present disclosure, the plurality of retained legal teams are determined until choices of the multi-users are stable.

In other embodiments of the present disclosure, the plurality of retained legal teams are determined when a preset number of calculation times is reached.

In some embodiments of the present disclosure, the plurality of legal teams is calculated according to an algorithm for solving a 0-1 knapsack problem.

In some embodiments of the present disclosure, the utilization rate of $team_j$ is accurate to two decimal places.

In some embodiments of the present disclosure, $w_1<1$ and $w_2>1$.

In some embodiments of the present disclosure, the preset number of times is defined by the PU.

With the method according to embodiments of the present disclosure, choices of the SUs in real life are fully considered to ensure fairness for each SU, thus ensuring that the utilization rate of the channels reaches the utilization rate threshold set by PU. Furthermore, by adopting the Shapley value to calculate the sharing price, the SUs can be guided to select the most advantageous legal team. Moreover, with the method according to embodiments of the present disclosure, not only the utilization rate threshold and the lowest selling price can be satisfied, but also the channels can be allocated reasonably.

Another objective of the present disclosure is to provide a computer readable storage medium. The computer readable storage medium comprises a computer program for executing the channel allocation method based on Shapley value in wireless networks according to the above present disclosures when running on a computer.

These and other aspects and advantages of the disclosure will be present in the following descriptions, and part of them will become apparent and more readily appreciated from the following descriptions, or be understood through the embodiment of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

The method for allocating channels according to the present disclosure can be applied directly in the region where channels are not distributed evenly. The method according to the present disclosure is performed based on a fact that a PU has idle channels to be used by other users and a plurality of SUs desire to buy channels. In this application, only the condition that demand exceeds supply is considered, this is because the demand of each SU can be satisfied when there are sufficient channels. With regard to the above condition, a fair channel allocation method is designed herein, which fully considers the psychology of the SUs, generates an optimal team in the form of alliance, and buy the channels in the form of team, thus having more practice significance.

Figure 1:
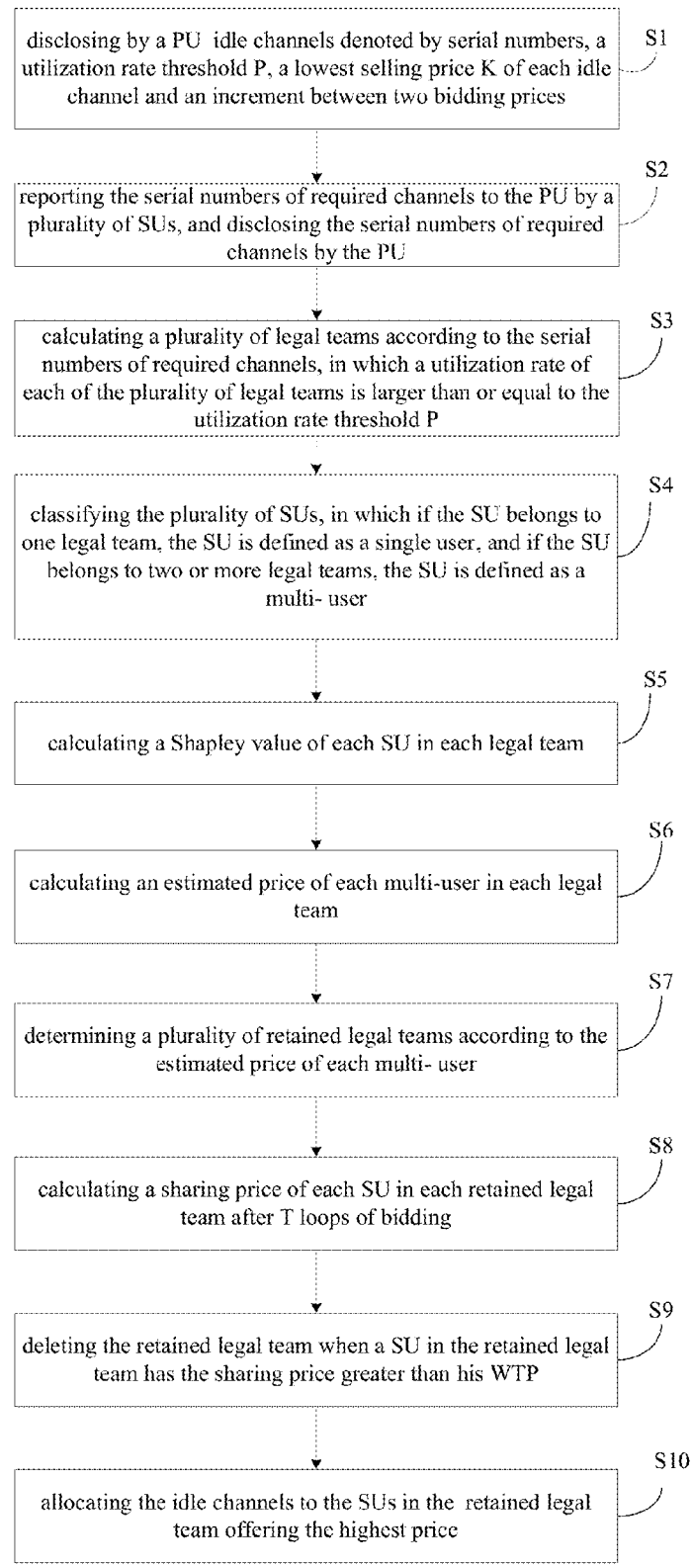
FIG. 1 is a flow chart of a channel allocation method in wireless networks according to an embodiment of the present disclosure.

FIG. 1 is a flow chart of a channel allocation method in wireless networks according to an embodiment of the present disclosure. As shown in FIG. 1, the method includes the following steps.

At step S1, a PU discloses idle channels denoted by serial numbers, a utilization rate threshold P, a lowest selling price K of each idle channel and an increment σ between two bidding prices.

At step S2, a plurality of SUs report the serial numbers of required channels to the PU, and the PU discloses the serial numbers of required channels.

It should be noticed that, the PU discloses the serial numbers of required channels as common knowledge, i.e., each SU knows the serial numbers of required channels of other SUs, and each SU knows that the other SUs know the serial numbers of his required channels.

At step S3, the PU calculates a plurality of legal teams according to the serial numbers of required channels, in which a utilization rate of each of the plurality of legal teams is larger than or equal to the utilization rate threshold P.

It should be noticed that, the plurality of legal teams satisfying the utilization rate threshold P are preferably calculated according to an algorithm for solving a 0-1 knapsack problem in the integral linear programming field. It should be understood that each legal team comprises some SUs and a corresponding utilization rate, which are disclosed as the common knowledge. In other words, only the legal teams satisfying the utilization rate threshold P can be obtained for executing following steps. Further, the legal teams whose utilization rates do not reach the utilization rate threshold P has a zero income, and the legal teams whose utilization rates reach the utilization rate threshold P has the income in proportion to the utilization rate. In other words, the higher the utilization rate is, the lower the sharing price of each SU is, and the higher the income of the legal team is.

At step S4, the plurality of SUs are classified. Specifically, if the SU belongs to one legal team, the SU is defined as a single user, and if the SU belongs to two or more legal teams, the SU is defined as a multi-user.

At step S5, a Shapley value of each SU in each legal team is calculated according to the following formula, $$shapley_{SU_i}^{team_j} = \frac{U_{SU_i}}{\sum_{k \in team_j} U_{SU_k}} \times w\{team_j - (SU_i)\},$$

where, $team_j$ denotes a $j^{th}$ legal team, $SU_i$ denotes an $i^{th}$ secondary user, $U_{SU_i}$ denotes a number of the channels required by $SU_i$, $$\sum_{k \in team_j} U_{SU_k}$$

denotes a total number of the channels required by $team_j$, $shapley_{SU_i}^{team_j}$ denotes the Shapley value of $SU_i$ in $team_j$, and when a utilization rate of other SUs in team, except $SU_i$ is greater than or equal to the utilization rate threshold P, $w\{team_j-(SU_i)\}$ equals to $w_1$, otherwise, $w\{team_j-(SU_i)\}$ equals to $w_2$.

In one embodiment of the present disclosure, $w_1<1$ and $w_2>1$.

At step S6, an estimated price of each multi-user in each legal team is calculated according to the following formula, $$price_{SU_{multi}^i}^{team_j} = \frac{1}{shapley_{SU_{multi}^i}^{team_j}} \times U_{SU_{multi}^i} \div P_{team_j},$$

where, $$price_{SU_{multi}^i}^{team_j}$$

is an estimated price of an $i^{th}$ multi-user $SU_{multi}$ in $team_j$, $P_{team_j}$ is the utilization rate of $team_j$.

At step S7, a plurality of retained legal teams are determined according to the estimated price of each multi-user.

Specifically, the plurality of retained legal teams may be determined according to the choices of the SUs, which depend on the estimated price of each multi-user. In other words, each $SU_{multi}$ will choose the lowest $$price_{SU_{multi}^i}^{team_j}$$

and stay in the corresponding team. In one embodiment, the plurality of retained legal teams are determined until the choices of multi-users are stable. In another embodiment of the present disclosure, the plurality of retained legal teams are determined when a preset number of calculation times is reached. The preset number of calculation times is defined by the PU. The method for obtaining the retained legal teams will be described in detail below with reference to FIG. 2.

At step S8, a sharing price of each SU in each retained legal team after T loops of bidding is calculated according to the following formula, $$PRICE_{SU^n}^{team_j} = \left( \frac{1}{\frac{1}{shapley_{SU_i}^{team_j}} + \frac{1}{shapley_{SU_i^2}^{team_j}} + \ldots + \frac{1}{shapley_{SU^n}^{team_j}}} \times \frac{1}{shapley_{SU^n}^{team_j}} \times P_{total} \right) \times U_{SU^n}$$

where, $P_{total} = K + T\sigma$.

After obtaining the retained legal teams, they begin to bid with each bidding value at least $\sigma$ higher than a former one.

At step S9, the retained legal team is deleted when a SU in the retained legal team has the sharing price greater than his WTP (willingness to pay). In other words, the retained legal team is deleted with a SU member exists the game.

Steps S8 and S9 are repeated until only one retained legal team is left, and then step S10 is executed.

At step S10, the idle channels are allocated to the SUs in the one retained legal team.

Figure 2:
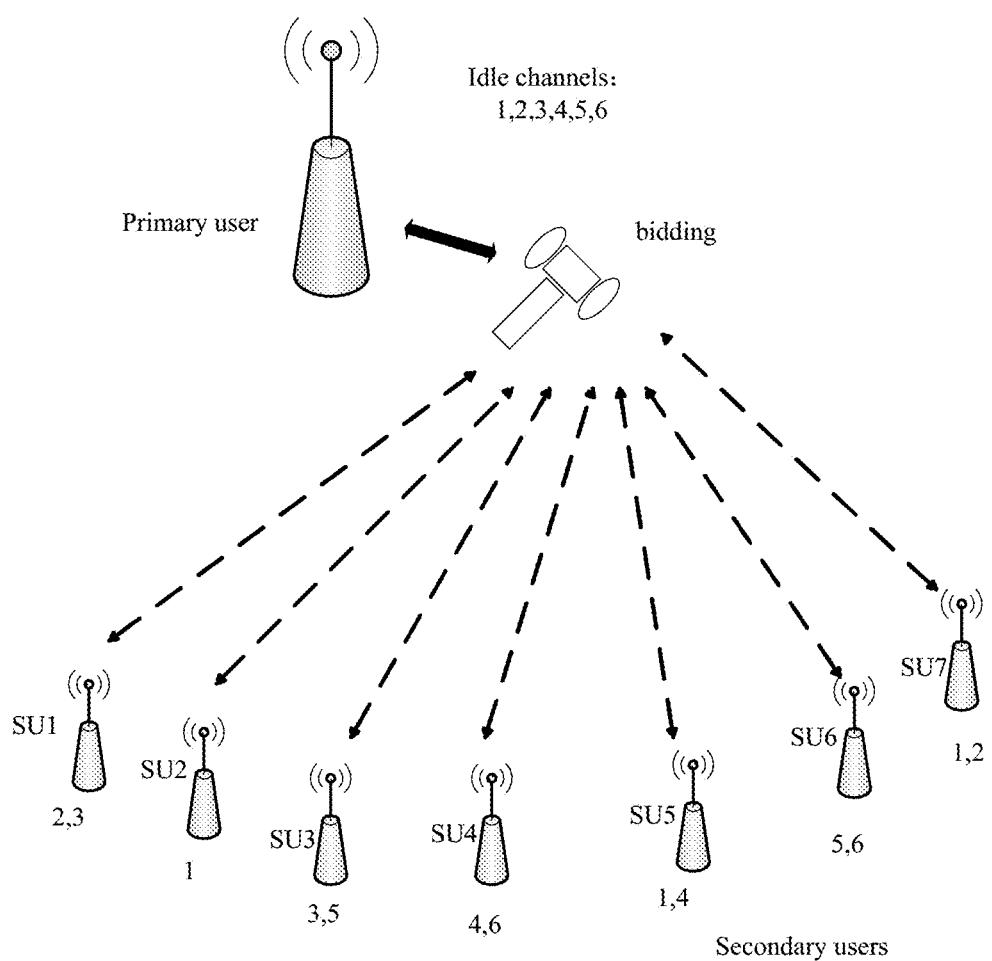
FIG. 2 is a schematic diagram showing a bidding process according to an embodiment of the present disclosure.

The channel allocation method in wireless networks according to the present disclosure will be described by taking the bidding process shown in FIG. 2 as an example. As shown in FIG. 2, the PU discloses that there are six idle channels 1, 2, 3, 4, 5, and 6, the utilization rate threshold P=80%, and the lowest selling price K of each channel is 1 million RMB.

As shown in FIG. 2, in this example, the channels required by each second user are as follows: SU1=(2, 3), SU2=(1), SU3=(3, 5), SU4=(4, 6), SU5=(1, 4), SU6=(5, 6), SU7=(1, 2), in which SU1 denotes the secondary user 1, and so on. Since each SU reports the serial numbers of the required channels simultaneously, and each SU does not know the serial numbers of the other SUs' required channels, each SU will report real serial numbers. According to the algorithm for solving the 0-1 knapsack problem, a plurality of legal teams satisfying the utilization rate threshold P can be calculated, as shown in Table 1.

TABLE 1

Legal teams satisfying the utilization rate threshold P

| legal teams | SUs in the team | utilization rate |
| --- | --- | --- |
| team$_1$ | SU1, SU2, SU4 | 83% |
| team$_2$ | SU2, SU3, SU4 | 83% |
| team$_3$ | SU1, SU2, SU6 | 83% |
| team$_4$ | SU1, SU5, SU6 | 100% |
| team$_5$ | SU3, SU4, SU7 | 100% |

After obtaining the legal teams, it can be seen that, SU5 and SU7 are only in a single team, and thus they are single users. Furthermore, SU1, SU2, SU3, SU4 and SU6 are in two or more legal teams, and thus they are multi-users. Taking the secondary user SU1 as an example, the Shapley value and the estimated price of SU1 in the legal team team$_1$ are calculated as follows.

$$shapley_{SU_{multi}^1}^{team_1} = \frac{U_{SU_{multi}^1}}{\sum_{k \in team_1}} \times w\{team_1 - (SU_{multi}^1)\} = \frac{2}{5} \times w_2$$

$$price_{SU_{multi}^1}^{team_1} = \frac{1}{shapley_{SU_{multi}^1}^{team_1}} \times U_{SU_{multi}^1} \div P_{team_1} = \frac{5}{2 \times w_2} \times 2 \div 83\% = \frac{6.02}{w_2}$$

Likewise, $$price_{SU_{multi}^1}^{team_1} = \frac{6.02}{w_2},$$

$$price_{SU_{multi}^1}^{team_1} \frac{6}{w_2}.$$

As $$price_{SU_{multi}^1}^{team_4} < price_{SU_{multi}^1}^{team_3} = price_{SU_{multi}^1}^{team_1},$$

SU1 will choose to leave in the team$_4$={SU 1, SU 5, SU 6} temporarily. Likewise, the choices of other multi-users are calculated. Then, the above steps are repeated for the preset number of times or until the choices of multi-users are stable. In other words, in a condition that each multi-user $SU_{multi}^l$ has already been fixed in a legal team when the calculation times is less than the preset number of times, the legal teams where the multi-users are fixed in are optimal, and then each multi-user will not change his choice when a next calibration is executed. Thus, a steady state is reached, and the retained legal teams which can participate in the open bidding are obtained.

The steady state is illustrated by taking SU6 as an example. As $$price_{SU_{multi}^6}^{team_4} < price_{SU_{multi}^6}^{team_3},$$

SU6 will choose to leave in the legal team team$_4$. Moreover, since SU5 is a single user, he necessarily chooses to leave in the legal team team$_4$. Then, for the secondary user SU1, the optimal team is obviously the legal team team$_4$. Thus, when a next calculation is executed, the secondary user SU1 will not change his choice, i.e., still chooses the legal team team$_4$. Likewise, for the secondary user SU6, since the secondary user SU1 chooses the legal team team$_4$, the legal team team$_3$ will not satisfy the utilization rate threshold P, and the secondary user SU6 will be fixed in the legal team team$_4$. Thus, the legal team team$_4$ is retained.

Next, the choices of the multi-users SU3 and SU4 are analyzed. For the secondary user SU4, $$price_{SU_{multi}^4}^{team_1} = price_{SU_{multi}^2}^{team_2} = \frac{5}{2 \times w_2} \times 2 \div 83\% = \frac{6.02}{w_2} > price_{SU_{multi}^4}^{team_5} = \frac{6}{2 \times w_2} \times 2 \div 100\% = \frac{6}{w_2},$$

so the optimal choice for the secondary user SU4 is to leave in the legal team team$_5$. Likewise, the optimal choice for the secondary user SU3 is also the legal team team$_5$. Furthermore, since the secondary user SU7 is a single user, he necessarily chooses the legal team team$_5$. Thus, the legal team team$_5$={SU3, SU4, SU7} is retained.

In conclusion, the retained legal teams are the legal teams team$_4$={SU 1, SU 5, SU 6} and team$_5$={SU3, SU4, SU7}, and these legal teams participate in the open bidding for channels.

During the open bidding, the legal team offering the highest price will obtain the required channels. Assuming that the psychological prices of SU1, SU5, SU6, SU3, SU4 and SU7 are 1.20 million RMB per channel, 1.35 million RMB per channel, 1.30 million RMB per channel, 1.30 million RMB per channel, 1.28 million RMB per channel and 1.32 million RMB per channel respectively, the preset lowest selling price K is 1 million RMB per channel, and the increment between two bidding prices σ is 50 thousand RMB per channel, when the bidding price reaches 1.15 million RMB per channel, the price of each channel in the legal team team$_4$ is 1.20 million RMB, and the sharing price of the secondary user SU1 reaches 1.20 million RMB per chanel according to ratio between the estimated prices of SU1, SU5 and SU6

$$\left(PRICE_{SU_{multi}^1}^{team_4} : PRICE_{SU_{multi}^5}^{team_4} : PRICE_{SU_{multi}^6}^{team_4} = 1:1:1\right).$$

Figure 3:
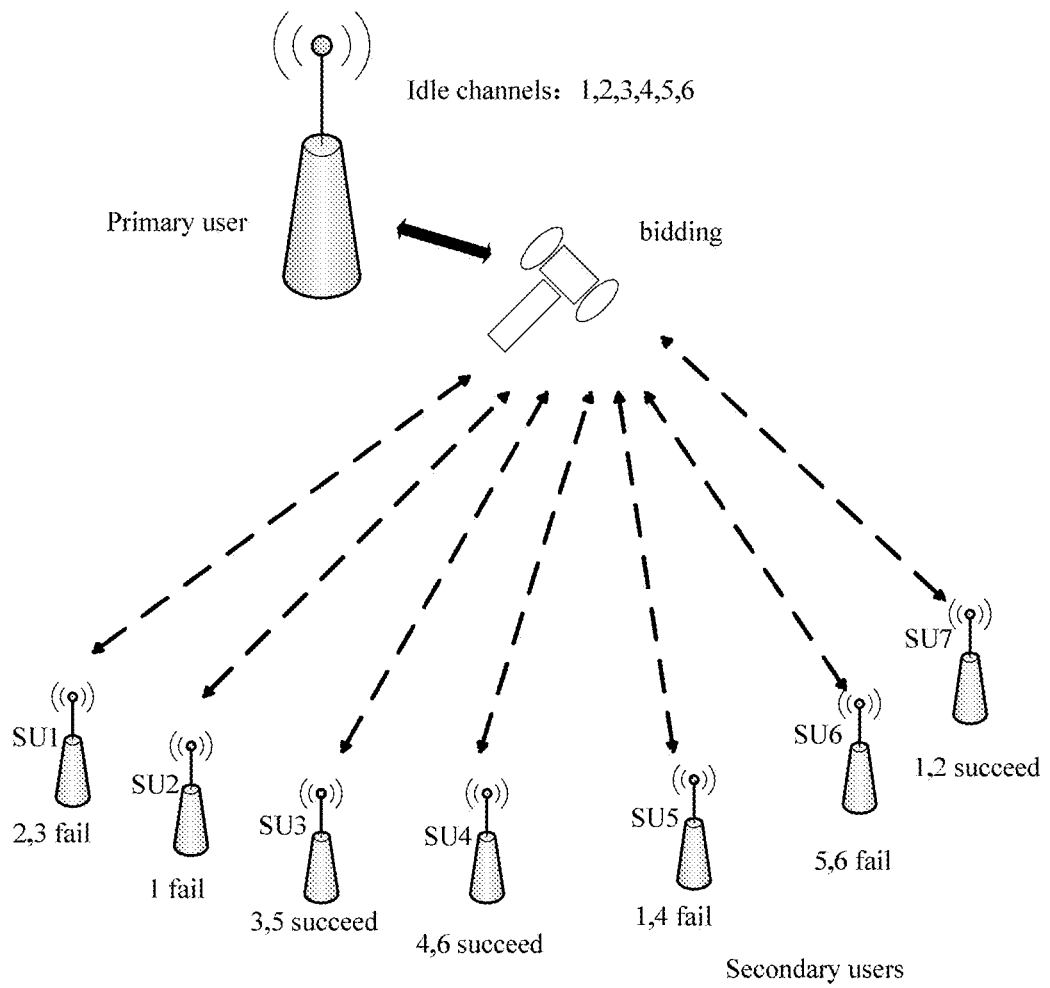
FIG. 3 is a schematic diagram showing a bidding result of the bidding process shown in FIG. 2.

At this time, the legal team team$_5$ will go on offering 1.25 million RMB per channel, and according to the ratio between the estimated prices of SU3, SU4 and SU7

$$\left(PRICE_{SU_{multi}^3}^{team_5} : PRICE_{SU_{multi}^4}^{team_5} : PRICE_{SU_{multi}^7}^{team_5} = 1:1:1\right),$$

the sharing price of each of SU3, SU4 and SU7 in the legal team team$_5$ is 1.25 million RMB per channel. However, if the legal team team$_4$ goes on offering the sharing price 1.30 million RMB per channel, the secondary user SU1 will not accept the sharing price, and then the legal team team$_4$ quits the bidding. Thus, the legal team team$_5$ wins the bidding with the sharing price 1.25 million RMB per channel, as shown in FIG. 3.

With the method according to embodiments of the present disclosure, choices of the SUs in real life are fully considered to ensure fairness for each SU, thus ensuring that the utilization rate of the channels reaches the utilization rate threshold. Furthermore, by adopting the Shapley value to calculate the sharing price, the SUs can be guided to select the most advantageous legal team. Moreover, with the method according to embodiments of the present disclosure, not only the utilization rate threshold and the lowest selling price can be satisfied, but also the channels can be allocated reasonably.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

According to an embodiment of the present disclosure, a computer readable storage medium is provided. The computer readable storage medium includes a computer program for executing the channel allocation method based on Shapley value in wireless networks described above when running on a computer.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A channel allocation method based on Shapley value in wireless networks, comprising:
    S1: disclosing by a primary user PU serial numbers of idle wireless channels, a utilization rate threshold P, a lowest selling price K of each idle wireless channel and an increment σ between two bidding prices;
    S2: reporting the serial numbers of required channels to the PU by a plurality of secondary users SUs, and disclosing the serial numbers of required channels by the PU;
    S3: calculating a plurality of legal teams according to the serial numbers of required channels, wherein a utilization rate of each of the plurality of legal teams is larger than or equal to the utilization rate threshold P;

S4: classifying the plurality of SUs, wherein, if the SU belongs to one legal team, the SU is defined as a single user, and if the SU belongs to two or more legal teams, the SU is defined as a multi-user;

S5: calculating a Shapley value of each SU in each legal team according to the following formula, $$shapley_{SU_i}^{team_j} = \frac{U_{SU_i}}{\sum_{k \in team_j} U_{SU_k}} \times w\{team_j - (SU_i)\},$$

where, $team_j$ denotes a $j^{th}$ legal team, $SU_i$ denotes an $i^{th}$ SU $U_{SU_i}$ denotes a number of the channels required by the $i^{th}$ secondary user $SU_i$, $$\sum_{k \in team_j} U_{SU_k}$$

denotes a total number of the channels required by the $j^{th}$ legal team $team_j$, $shapley_{SU_i}^{team_j}$ denotes the Shapley value of $SU_i$ in $team_j$, and when a total utilization rate of other SUs in $team_j$ except $SU_i$ is greater than or equal to the utilization rate threshold P, $w\{team_j-(SU_i)\}$ equals to $w_1$, otherwise, $w\{team_j-(SU_i)\}$ equals to $w_2$;

S6: calculating an estimated price of each multi-user in each legal team according to the following formula, $$price_{SU_{multi}^i}^{team_j} = \frac{1}{shapley_{SU_i}^{team_j}} \times U_{SU_{multi}^i} \div P_{team_j},$$

where, $$price_{SU_{multi}^i}^{team_j}$$

is an estimated price of an $i^{th}$ multi-user $SU_{multi}$ in $team_j$, $P_{team_j}$ is the utilization rate of $team_j$;

S7: determining a plurality of retained legal teams according to the estimated price of each multi-user;

S8: calculating a sharing price of each SU in each retained legal team after T loops of bidding according to the following formula, $$PRICE_{SU^n}^{team_j} = \left( \frac{1}{\frac{1}{shapley_{SU_i^1}^{team_j}} + \frac{1}{shapley_{SU_i^2}^{team_j}} + \ldots + \frac{1}{shapley_{SU_i^n}^{team_j}}} \times \frac{1}{shapley_{SU^n}^{team_j}} \times P_{total} \right) \times U_{SU^n}$$

where, $P_{total} = K + T\sigma$;

S9: deleting the retained legal team when a SU in the retained legal team has the sharing price greater than his willingness to pay WTP;

S10: repeating steps S8 and S9 until one retained legal team is left, and allocating the idle channels to the SUs in the one retained legal team.

2. The method according to claim 1, wherein the plurality of retained legal teams are determined until a choice of each multi-user is stable.

3. The method according to claim 1, wherein the plurality of retained legal teams are determined when a preset number of calculation times is reached.

4. The method according to claim 3, wherein the preset number of calculation times is defined by the PU.

5. The method according to claim 1, wherein the plurality of legal teams are calculated according to an algorithm for solving a 0-1 knapsack problem.

6. The method according to claim 1, wherein the utilization rate of the $j^{th}$ legal team $team_j$ is accurate to two decimal places.

7. The method according to claim 1, wherein, $w_1 < 1$ and $w_2 > 1$.

8. A non-transitory computer readable storage medium, comprising a computer program, wherein when the computer program is running on a computer, the computer program is configured for executing steps of:

S1: disclosing by a primary user PU serial numbers of idle wireless channels, a utilization rate threshold P, a lowest selling price K of each idle wireless channel and an increment $\sigma$ between two bidding prices;

S2: reporting the serial numbers of required channels to the PU by a plurality of secondary users SUs, and disclosing the serial numbers of required channels by the PU;

S3: calculating a plurality of legal teams according to the serial numbers of required channels, wherein a utilization rate of each of the plurality of legal teams is larger than or equal to the utilization rate threshold P;

S4: classifying the plurality of SUs, wherein, if the SU belongs to one legal team, the SU is defined as a single user, and if the SU belongs to two or more legal teams, the SU is defined as a multi-user;

S5: calculating a Shapley value of each SU in each legal team according to the following formula, $$shapley_{SU_i}^{team_j} = \frac{U_{SU_i}}{\sum_{k \in team_j} U_{SU_k}} \times w\{team_j - (SU_i)\},$$

where, $team_j$ denotes a $j^{th}$ legal team, $SU_i$ denotes an $i^{th}$ SU $U_{SU_i}$ denotes a number of the channels required by the $i^{th}$ secondary user $SU_i$, $$\sum_{k \in team_j} U_{SU_k}$$

denotes a total number of the channels required by the $j^{th}$ legal team $team_j$, $shapley_{SU_i}^{team_j}$ denotes the Shapley value of $SU_i$ in $team_j$, and when a total utilization rate of other SUs in $team_j$ except $SU_i$ is greater than or equal to the utilization rate threshold P, $w\{team_j-(SU_i)\}$ equals to $w_1$, otherwise, $w\{team_j-(SU_i)\}$ equals to $w_2$;

S6: calculating an estimated price of each multi-user in each legal team according to the following formula, $$price_{SU^i_{multi}}^{team_j} = \frac{1}{shapley_{SU^i_{multi}}^{team_j}} \times U_{SU^i_{multi}} \div P_{team_j},$$

where, $$price_{SU^i_{multi}}^{team_j}$$

is an estimated price of an $i^{th}$ multi-user $SU_{multi}$ in $team_j$, $P_{team_j}$ is the utilization rate of $team_j$;

S7: determining a plurality of retained legal teams according to the estimated price of each multi-user;

S8: calculating a sharing price of each SU in each retained legal team after T loops of bidding according to the following formula, $$PRICE_{SU^n}^{team_j} = \left( \frac{1}{\frac{1}{shapley_{SU_1}^{team_j}} + \frac{1}{shapley_{SU_2^i}^{team_j}} + \ldots + \frac{1}{shapley_{SU^n}^{team_j}}} \times \frac{1}{shapley_{SU^n}^{team_j}} \times P_{total} \right) \times U_{SU^n}$$

where, $P_{total}=K+T\sigma$;

S9: deleting the retained legal team when a SU in the retained legal team has the sharing price greater than his willingness to pay WTP;

S10: repeating steps S8 and S9 until one retained legal team is left, and allocating the idle channels to the SUs in the one retained legal team.

9. The non-transitory computer readable storage medium according to claim 8, wherein the plurality of retained legal teams are determined until a choice of each multi-user is stable.

10. The non-transitory computer readable storage medium according to claim 8, wherein the plurality of retained legal teams are determined when a preset number of calculation times is reached.

11. The non-transitory computer readable storage medium according to claim 10 the preset number of calculation times is defined by the PU.

12. The non-transitory computer readable storage medium according to claim 8, wherein the plurality of legal teams are calculated according to an algorithm for solving a 0-1 knapsack problem.

13. The non-transitory computer readable storage medium according to claim 8, the utilization rate of the $j^{th}$ legal team $team_j$ is accurate to two decimal places.

14. The non-transitory computer readable storage medium according to claim 8, wherein, $w_1<1$ and $w_2>1$.

* * * * *